United States Patent
Zadravec

(10) Patent No.: US 6,483,647 B2
(45) Date of Patent: Nov. 19, 2002

(54) NIGHT VISION DEVICE

(75) Inventor: Dusan Zadravec, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 3 days.

(21) Appl. No.: 09/782,606

(22) Filed: Feb. 14, 2001

(65) Prior Publication Data

US 2001/0033424 A1 Oct. 25, 2001

(30) Foreign Application Priority Data

Feb. 15, 2000 (EP) .............................................. 00103017

(51) Int. Cl.[7] .............................................. G02B 27/14
(52) U.S. Cl. ...................................... 359/634; 359/633
(58) Field of Search .................................. 359/634, 630, 359/631, 632, 633, 627, 815; 345/7, 8, 9

(56) References Cited

U.S. PATENT DOCUMENTS

| | | | |
|---|---|---|---|
| 4,961,626 A | * 10/1990 | Fornier, Jr. et al. | ......... 359/630 |
| 5,305,124 A | * 4/1994 | Chern et al. | ................. 359/13 |
| 5,629,807 A | 5/1997 | Hall | |
| 5,747,792 A | * 5/1998 | Kintz | .................. 250/214 VT |
| 6,094,304 A | * 6/2000 | Wallace et al. | ............. 359/425 |
| 6,121,601 A | * 9/2000 | Afsenius | ..................... 250/214 |
| 6,304,386 B1 | * 10/2001 | Potin | .......................... 359/630 |
| 6,342,872 B1 | * 1/2002 | Potin et al. | |
| 6,369,941 B2 | * 4/2002 | Zadravec | .................... 359/419 |

FOREIGN PATENT DOCUMENTS

| | | |
|---|---|---|
| EP | 0 412 828 A2 | 2/1991 |
| GB | 2 100 466 A | 12/1982 |
| WO | WO97/45760 A1 | 12/1997 |

* cited by examiner

Primary Examiner—Georgia Epps
Assistant Examiner—Saeed Seyrafi
(74) Attorney, Agent, or Firm—Rothwell, Figg, Ernst & Manbeck, p.c.

(57) ABSTRACT

A night vision device has a lens (1) arranged along an optical axis (A) and focusing the low-level light emanating from an object to be observed onto an entry window (2) of a low-light-level amplifier (3). An optical module (6–8) projects the object image available at the exit window (4) of the low-light-level amplifier (3) and represented in a predetermined wavelength range onto at least one receptor, such as a human eye (9). The beam path between the exit window (4) of the low-light-level amplifier (3) and the receptor (9) is determined by reflective optical elements (6, 8), one (8) of which is located along an axis (B) leading to the receptor (9) essentially parallel to the axis (A) of the lens (1) and is essentially reflective for the predetermined wavelength range of the low-light-level amplifier (3) but, if required, essentially transparent for other wavelength ranges.

12 Claims, 2 Drawing Sheets

NIGHT VISION DEVICE

FIELD OF THE INVENTION

The invention relates to a night vision device and in particular to a monocular night vision device.

DESCRIPTION OF THE BACKGROUND ART

Monocular night vision devices are essentially designed according to the following principle. A, preferably fast, lens focuses the rays emanating from an object to be observed onto an entry window of a low-light-level amplifier. The image of the object is electrically amplified there and, owing to the phosphorescent coating on the exit of the low-light-level amplifier, appears as a bright green image on its exit window. The substantial feature of the low-light-level amplifier in this context is that it is provided with an inverter (image inversion system) which inverts the amplified green image of the object. This green image is projected via an eyepiece into the user's eye. Equipping the low-light-level amplifier with an inverter is expensive, and the length and the weight of the low-light-level amplifier increase substantially.

On the other hand, instead of by means of an inverter, it is possible to invert the electronically amplified green image of the object by means of a separate optical inverter which then projects the image through an eyepiece into the eye. However, the result is virtually the same because, in the case of conventional inverters formed from lenses, the result is then a long, heavy and relatively expensive (monocular) night vision device.

SUMMARY OF THE INVENTION

In contrast, it is the object of the invention to provide a night vision device, in particular a monocular night vision device, which requires neither a low-light-level amplifier with a conventional inverter nor a separate optical system for the image inversion. As a result of these circumstances, it should be possible substantially to reduce length, weight and manufacturing costs of the device.

This can be achieved, according to the invention, by realizing the characterizing features of Claim 1 and those of Claim 10. When it is stated that the optical axis passing through the lens of the device should be "essentially" parallel to the axis leading to the receptor, small deviations from parallelism may result from a parallax compensation. When it is stated that the beam path between the exit window of the low-light-level amplifier and the receptor is determined by reflective optical elements, this by no means rules out that lenses too, i.e. refractive elements, are concomitantly used, for example for changing the magnification factor.

Advantageous alternative embodiments are described by the features of the dependent Claims.

In the invention, in principle the refractive optical parts between the low-light-level amplifier and the human eye are replaced by reflective ones, which reduces the manufacturing costs for the device according to the invention. With respect to the comfort of wear, too, this represents a not inconsiderable reduction in weight and assembled length. In addition, the achievement according to the invention, comprising reflective optical elements, still has the property of being able to observe the object directly (for example as through sunglasses) and at the same time of seeing its amplified, in general green image—superposed on the "direct" image.

BRIEF DESCRIPTION OF THE DRAWINGS

The invention is described purely by way of example below, with reference to the drawing.

DETAILED DESCRIPTION OF THE INVENTION

Figure 1:
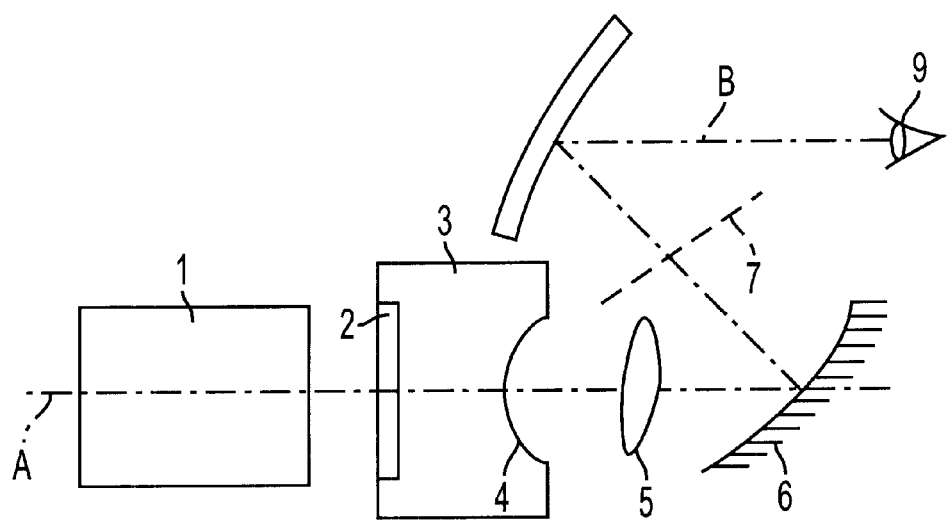
FIG. 1 shows a schematic representation of the optical system of a night vision device according to the invention, in particular a monocular one.

The substantial components of a monocular night vision device according to the invention are shown in FIG. 1. A first lens 1 preferably designed for the wavelength range from about 450 to 950 nm focuses the rays emanating from an object to be observed onto an entry window 2 of a low-light-level amplifier 3. This low-light-level amplifier 3 corresponds in its design in particular to one of the generations sold on the market under the designation Gen II, Gen III or Gen IV. In this low-light-level amplifier 3, the image of the object is electronically amplified and appears on the phosphorescent exit window 4 of the low-light-level amplifier 3 as a bright green image. This green image is collimated by means of a lens system 5 onto an optical element 6. This optical element 6 focuses the incident beam in an intermediate image plane 7. For this purpose, the optical element 6 is, for example, in the form of a mirror, which may be spherical or aspherical.

The beam strikes the surface of a reflective optical element 8 which simultaneously acts as a transparent spectacle lens and, in the version shown, is concave towards the eye 9. The surface facing the eye 9 can, however, also be aspherical or toroidal. One of the two surfaces of the reflective element 8, in the present case, for example, the surface facing the eye 9, is provided with a coating which exhibits a reflection maximum in the wavelength range of the light obtained via the low-light-level amplifier 3, i.e. phosphorescent green. In this way, the difference between the wavelength ranges of the light from outside and the wavelength range emitted by the low-light-level amplifier is advantageously utilized for the invention.

The intermediate image of the intermediate plane 7 is thus reflected and collimated by the reflective element 8 and projected into the eye 9. The imaging scale for the object image thus produced advantageously has a magnification factor of 1.

If the optical reflective element 8 simultaneously acts as a transparent spectacle lens, the eye also sees the object simultaneously directly through the reflective element 8—in a manner comparable with viewing through sunglasses. Since the beam incident through the lens and the beam passing through the reflective element 8 have beam paths essentially parallel to one another, a slight parallax would result per se, but the individual optical components 1 to 8 can be arranged, for example as known for binocular reflex cameras, in such a way that the amplified object image obtained via the low-light-level amplifier 3 and the directly available, generally extremely faint image of the object are exactly superposed in the eye and are thus projected onto the same areas of the retina—and, in particular with a magnification factor of 1, also on the same imaging scale.

The associated advantages are obvious. The perception of the object environment, i.e. of the real world, is improved by the dual vision, and the user's freedom of movement and feeling of security are increased. If the low-light-level amplifier 3 fails, a residual vision capability is still retained through the reflective element 8, in particular at dusk, and sudden total image failures are avoided. This applies in particular in the case of variable light conditions where the low-light-level amplifier may become "blind" owing to a suddenly increased light level or strong light sources entering the field of view of the night vision spectacles, so that the amplified image, too, becomes useless. In this case, the direct observation through the reflective element 8 simultaneously acting as a spectacles lens is possible, the human eye automatically adapting to the changed light conditions by altering the pupil size.

Lenses may be arranged between the optical element 6 and the reflective optical element 8, for improving the image quality. In addition, a reticle or a graphic or alphanumeric display could be arranged in the image plane 7.

A particular advantage of the present invention is the replacement of the refractive by the reflective optical system between the low-light-level amplifier 3 and the eye 9 and the resultant possibility of bending the beam path. Consequently, both the weight and the length of the device are reduced.

When the term "monocular" night vision device is used above, it should be noted that the optical system shown in FIG. 1 is of course effective as a monocular device. On the other hand, the invention is in no way restricted to monocular viewing since the beam path just described could indeed be provided for each of the two eyes, resulting in binocular viewing of the respective objects.

Figure 2:
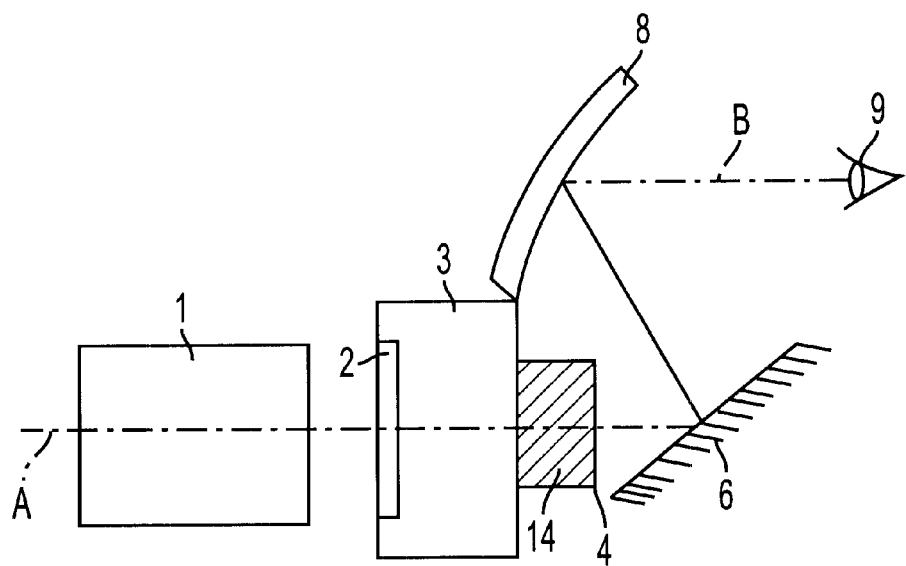
FIGS. 2 and 3 each show a variant thereof.

In the variant shown in FIG. 2 of the embodiment according to FIG. 1, the low-light-level amplifier 3, once again expediently corresponding in its design to one of the generations Gen II, Gen III or Gen IV, is provided with a fibreoptic inverter 14—instead of the conventional inverters comprising lenses or mirrors. This inverter is an optical fibre bundle which is rotated in such a way that its entry surfaces are turned through about 180° relative to its exit surfaces. The function of the fibreoptic inverter 14 is thus to invert the electronically amplified green image of the low-light-level amplifier 3 on the exit window 4' now located behind the inverter 14. The exit window 4' may be either perpendicular or at an angle to the optical axis of the low-light-level amplifier 3.

The green image of the low-light-level amplifier 3 inverted in this manner is then once again projected onto an optical element 6. As in the preceding embodiment, the optical element 6 reflects the incident beam onto the reflective element 8 already mentioned. For this purpose, the optical element 6 is, for example, in the form of a mirror which—as in the case of the mirror surface of the reflective element 8—may be planar, spherical or aspherical.

In this embodiment, too, the beam arriving from the reflective element 6 strikes the surface of the reflective optical element 8 simultaneously acting as a transparent spectacle lens. Here too, the reflective optical element 8 simultaneously acting as a transparent spectacle lens is provided on one of the two surfaces, for example on the surface facing the eye 9, with a coating which exhibits a reflection maximum in the wavelength range of the light obtained via the low-light-level amplifier 3, i.e. phosphorescent green. The beam is thus reflected and collimated by the reflective element 8 and projected into the eye 9. The imaging scale of the object image thus produced once again advantageously has a magnification factor of 1.

Figure 3:
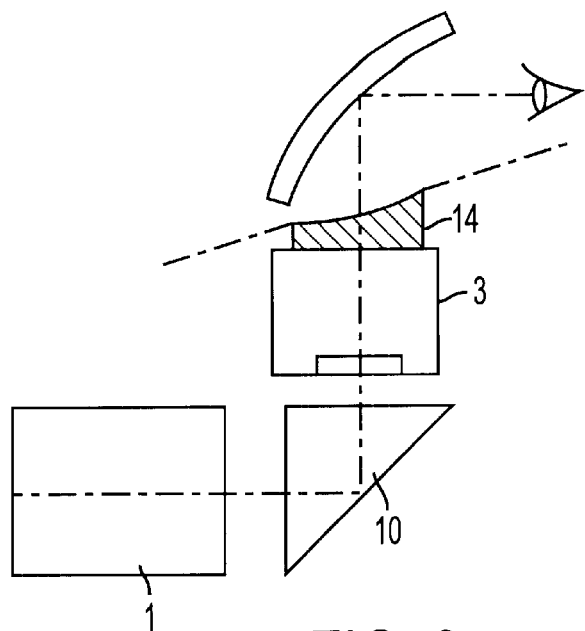

FIG. 3 is a variant of the embodiment according to FIG. 2. Here too, use is once again made of a fibreoptic inverter 14, which preferably has an exit window which may be flat or may have a curvature, for example a spherical or aspherical curvature, and makes an angle a with the optical axis of the low-light-level amplifier 3, which axis is indicated by a dash-dot line. In any case, the assembled length of the device can thus be further drastically reduced.

Figure 4:
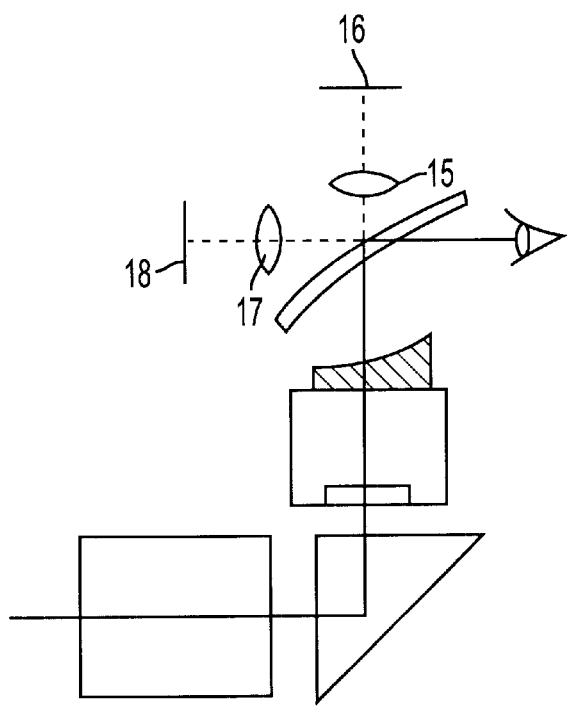
FIG. 4 shows a variant of FIG. 3.

FIG. 4 shows a variant corresponding to FIG. 3. The green image obtained via the low-light-level amplifier 3 and the inverter 14 is focused here via a lens 15 onto a CCD array 16 of high sensitivity. For this purpose, that surface of the reflective element 8 which faces the eye 9 is coated in such a way that a specific fraction of the light obtained via the low-light-level amplifier 3 can pass through while the other part of the light is focused by the reflective element 8 into the eye 9. In this way, the night image can also be observed on a monitor coordinated with the CCD array 16. For the sensitive CCD array, a transmission of 10–20% for the wavelength range in question will be sufficient; the corresponding intensity reduction for the fraction reflected into the eye is not very important since the light sensitivity of the eye is proportional to the logarithm of the stimulus. In addition, the maximum sensitivity of the eye (even for the light-adapted eye) is in the green colour range.

Corresponding to the numerical or graphic display possibly to be provided above in the image plane 7 in FIG. 1 it is possible here too—according to the use of the night vision device—to provide a display 18 which is projected via a lens or lens system 17 into the eye. Display 18 and lens system 17 are located along the optical axis B on which the receptor, the eye 9, and also the reflective element 8 are arranged.

What is claimed is:

1. Night vision device for observing an object by at least one receptor comprising:
   a low-light-level amplifier having an entry window for receiving low-level light emanated by the object and an exit window for presenting an amplified image of the object in a wavelength range,
   a lens being located along a first axis and focusing the low-level light to the entry window,
   a first reflective element being essentially reflective to the wavelength range and being located along a second axis leading to the receptor for supplying the amplified image to the receptor, wherein the first and the second axis are essentially parallel,
   a second reflective element being located within the beam path between the exit window and the first reflective element, in particular for producing an intermediate image, wherein the second reflective element is spherical, aspherical or toroidal, in particular concave towards the first reflective element.

2. Night vision device according to claim 1, wherein the first reflective element being essentially transparent for other wavelength ranges than the wavelength range.

3. Night vision device according to claim 1, wherein the first reflective element has a transmission of about 10–20% for the wavelength.

4. Night vision device according to claim 1, wherein the first reflective element is spherical, aspherical or toroidal, in particular concave, towards the receptor.

5. Night vision device according to claim 1, wherein the first reflective element is spherical, aspherical or toroidal, in particular convex, on the side facing away from the receptor.

6. Night vision device according to claim 1, wherein the image supplied to the receptor via the low-light-level amplifier has a magnification factor of 1.

7. Night vision device according to claim 1, wherein a fiber optic inverter is provided for inverting the amplified image at the exit window of the low-light-level amplifier.

8. Night vision device according to claim 7, wherein the exit window of the fiber optic inverter is inclined at an angle to the optical axis passing through it, in particular the optical axis of the low-light-level amplifier.

9. Night vision device according to claim 8, wherein the fiber optic inverter has a curvature, for example a spherical or aspherical curvature.

10. Night vision device according to claim 1, wherein in the beam path of the low-level light fraction available via the low-light-level amplifier and transmitted by the first reflective element, an arrangement for processing the optical signals output via this low-level light fraction is provided for displaying the image of the object to be observed on a monitor.

11. Night vision device according to claim 10, wherein an image generator, such as a graphic or alphanumeric display and a lens system coordinated therewith and having at least one lens are arranged along the second axis, the first reflective element being arranged in particular between the receptor and image generator and lens system.

12. Night vision device according to claim 10, wherein the arrangement for processing the optical signals is a CCD array.

* * * * *